United States Patent

[15] 3,690,443

Snyder

[45] Sept. 12, 1972

[54] TURN CONVEYOR
[72] Inventor: James R. Snyder, York, Pa.
[73] Assignee: Teledyne, Inc., York, Pa.
[22] Filed: Oct. 12, 1970
[21] Appl. No.: 79,923

[52] U.S. Cl. ................................................. 198/182
[51] Int. Cl. ............................................... B65g 15/02
[58] Field of Search ..................................... 198/182

[56] References Cited

UNITED STATES PATENTS 3,509,984  5/1970  Hartung et al. ......... 198/182 X
1,206,305  11/1916  Cowley ...................... 198/182

Primary Examiner—Richard E. Aegerter
Assistant Examiner—H. S. Lane
Attorney—Otto Moeller

[57] ABSTRACT

Article transporting apparatus having a rectilinear section at one or both ends of a curvilinear section, and including a plurality of laterally spaced endless conveyor elements extending the length of the transporting apparatus; operating said conveyor elements at relative speeds for turning the articles throughout their travel from one end to the other of the transporting apparatus to discharge them therefrom in the same orientation as they were delivered thereto, and means constraining the travel of the conveyor elements in particular paths coinciding with the pivotal axes of the articles on the conveyor elements.

6 Claims, 10 Drawing Figures

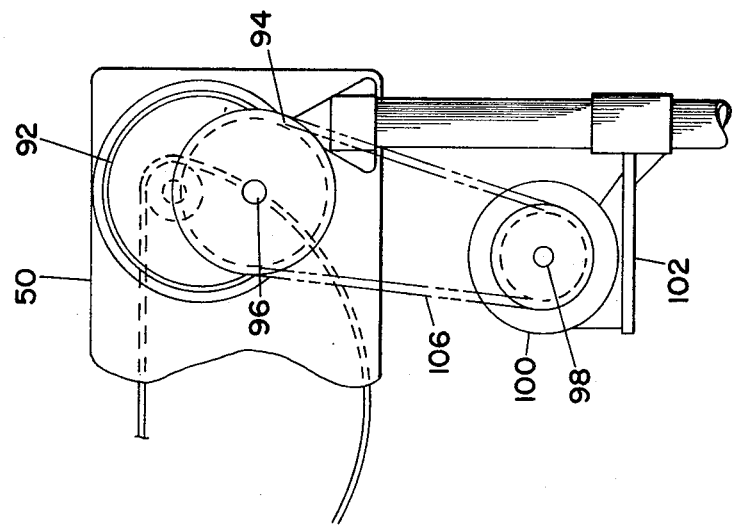
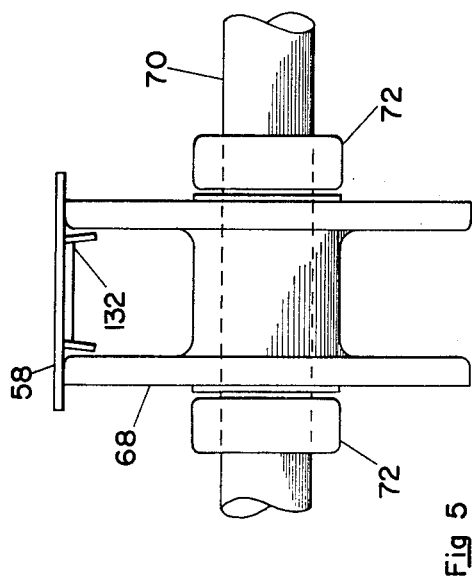
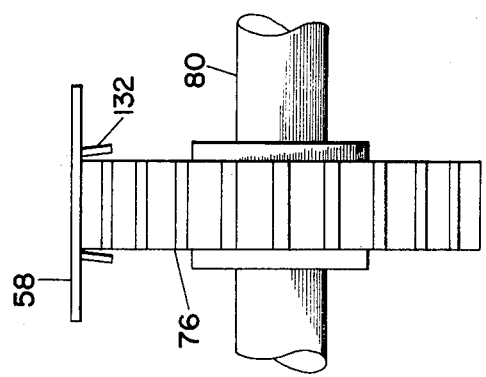
INVENTOR.
JAMES R. SNYDER

Fig 8
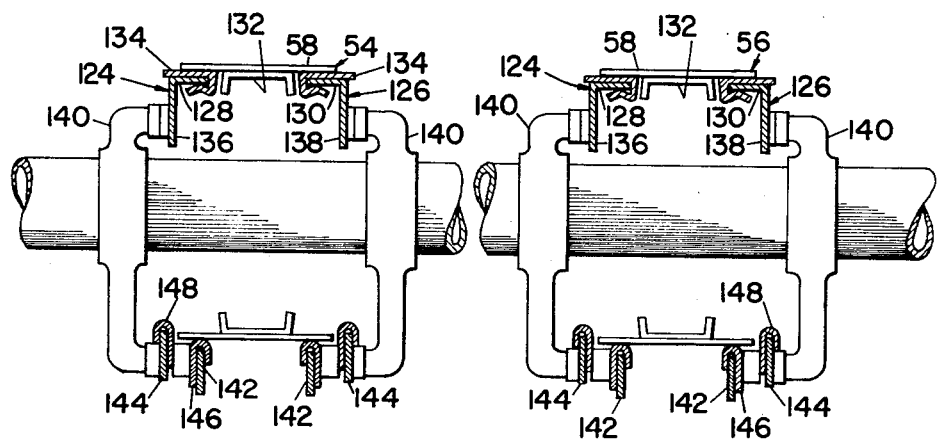
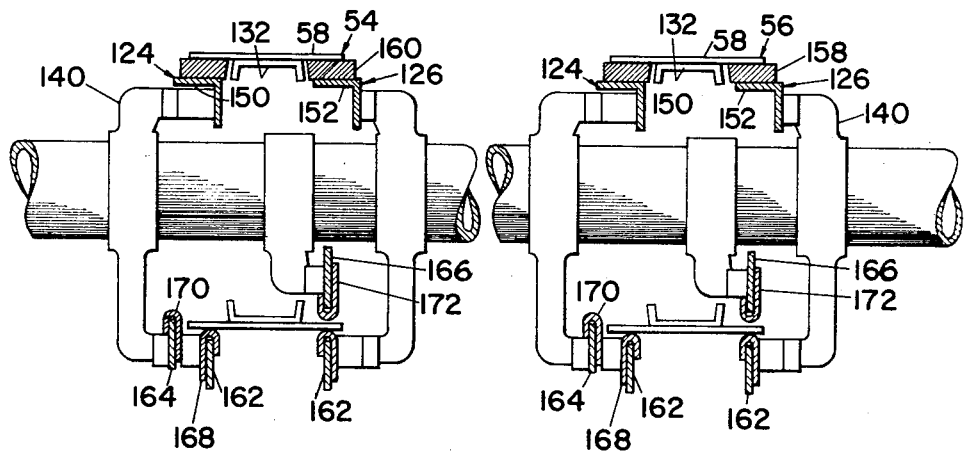
Fig 9

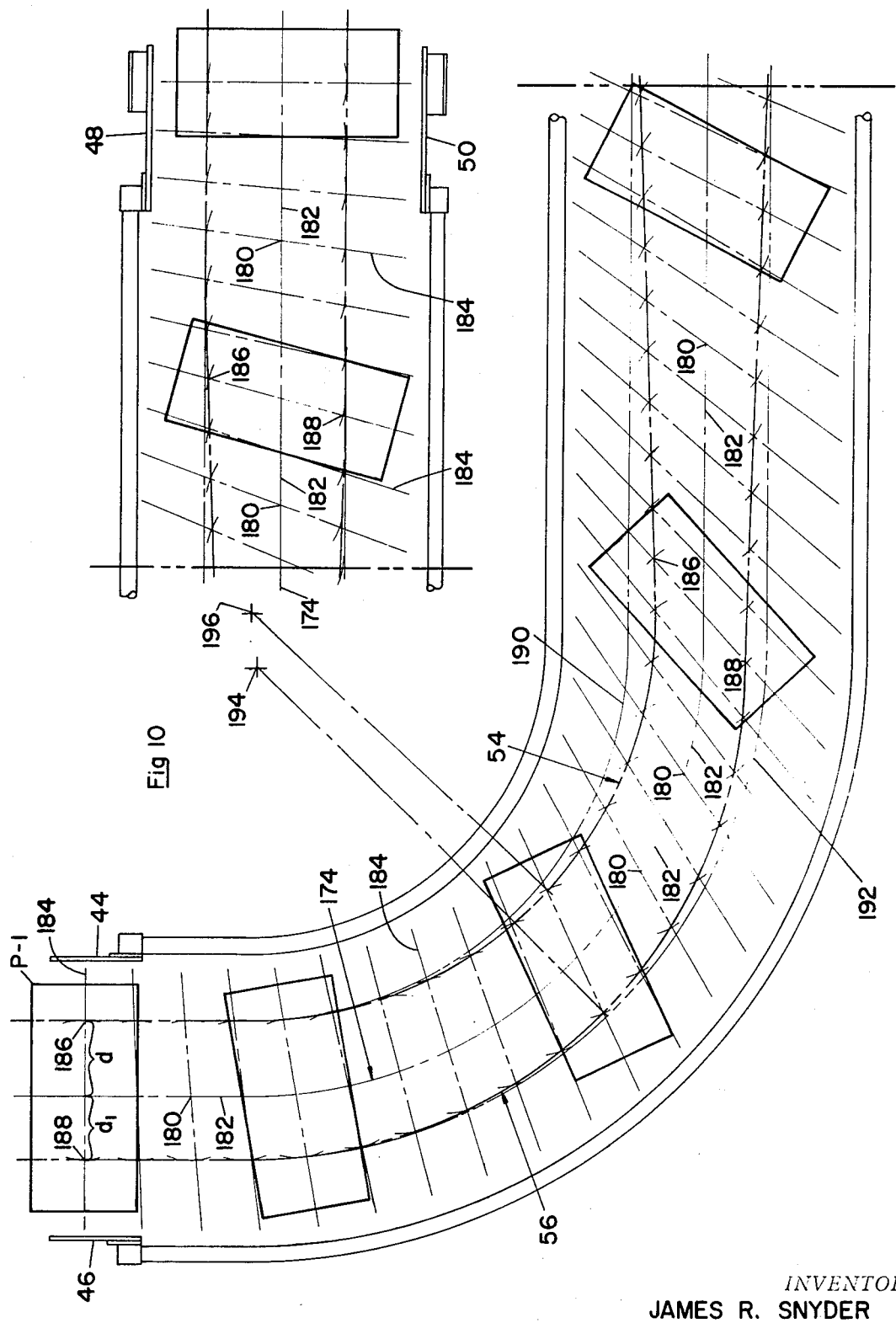

TURN CONVEYOR

BACKGROUND OF THE INVENTION

The invention relates to article transporting apparatus, in particular for use in large commercial bakeries for conveying a stream of pans of dough from a dough proofer to an oven including a curvilinear conveying section and a rectilinear conveying section at one or both ends of the curvilinear conveying section.

In conventional prior art article transporting apparatus, as exemplified by Van Doren, U.S. Pat. No. 2,652,143, the angularly related rectilinear conveyor sections are connected by a curvilinear conveyor section, each rectilinear conveyor section including parallel laterally spaced endless conveyor elements operating at the same speed and the curvilinear conveyor section including concentric spaced endless conveyor elements, the outer conveyor element operating at a sufficiently greater speed than the inner conveyor element to turn the articles so that they are discharged therefrom in the same orientation as they were delivered thereto.

To meet the high production rates desired by modern commercial bakeries, the speed of the outer curvilinear conveyor element in such prior art transporting apparatus becomes excessive, causing loss of control of the pans with consequent overturning or underturning of the pans and impairment of the desired orientation thereof, particularly where the pan or article transporting apparatus is employed in situations calling for intermittent operation.

It is an object of the invention to provide an improved transporting apparatus in which the turning of the articles or pans is accomplished throughout their travel along the rectilinear as well as the curvilinear conveyor sections from one end of the transporting conveyor to the other, so that the outer conveyor element need not travel at an excessively greater speed than the inner conveyor element and thus provide for improved control of the pans with more exacting and precise orientation thereof.

SUMMARY OF THE INVENTION

The invention provides a plurality of transversely spaced endless conveyor elements, each of which extends the full length of the curvilinear and rectilinear sections of the article or pan transporting apparatus, thereby eliminating the drive connections between the conveyor elements of the curvilinear and rectilinear conveyor sections.

The outer and inner endless conveyor elements are operated at relative speeds for turning the articles or pans throughout their travel from one end to the other of the transporting apparatus in order to discharge them therefrom in the same orientation as they were delivered thereto, instead of turning the articles or pans on only the curvilinear conveyor section, whereby the speed of the outer endless conveyor element relative to the inner conveyor element may be materially reduced to provide for improved control of the pans with more exacting and precise orientation thereof.

The invention additionally provides for constraining the paths of the inner and outer conveyor elements along particular non-parallel paths as contrasted to the conventional inner and outer conveyor elements mounted for movement in parallel paths. With the articles or pans, as previously noted, turning along the rectilinear as well as along the curvilinear conveyor sections, the paths of the outer and inner endless conveyor elements are arranged to coincide with the vertical pivotal axes of the articles or pans on the conveyor elements whereby to substantially restrict movement of the pans relative to the endless conveyor elements to pivotal movement exclusive of bodily shifting or displacement of the pans relative to the conveyor elements, thereby preventing loss of control of the pans and assuring more exacting and precise orientation of the pans.

These and other features and objects of the invention will become apparent from the following description when read in conjunction with the accompanying drawings.

BRIEF DESCRIPTION OF THE DRAWINGS

FIG. 3 is a fragmentary enlarged plan view of the conveyor element of the transporting apparatus;

FIG. 4 is a sectional view taken on the line 4—4 of FIG. 3;

FIG. 5 is an enlarged end view taken on the line 5—5 of FIG. 1;

FIG. 6 is an enlarged end view taken on the line 6—6 of FIG. 1;

FIG. 7 is a side elevational view taken on the line 7—7 of FIG. 2;

FIG. 8 is a sectional view taken on the line 8—8 of FIG. 1;

FIG. 9 is a sectional view taken on the line 9—9 of FIG. 1; and

FIG. 10 is a diagrammatic plan view of the transporting apparatus illustrating the manner in which the path of the conveying elements is arrived at.

Figure 1:
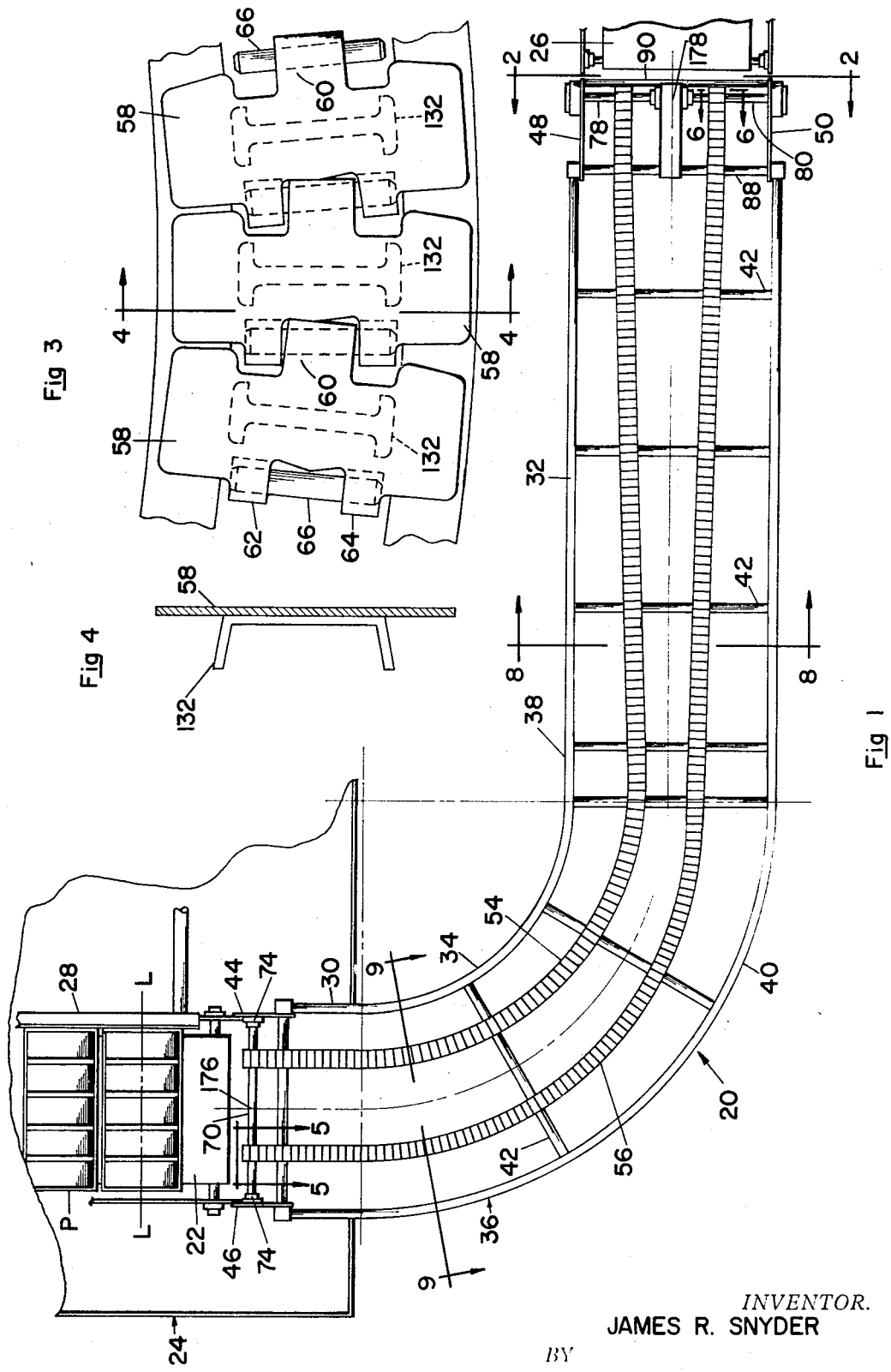
FIG. 1 is a schematic plan view of the article orienting transporting apparatus constructed in accordance with the invention.

Referring now to the drawings, the article transporting apparatus 20 is adapted to transfer articles from the discharge end of a first conveyor to the receiving end of a second conveyor angularly disposed with respect to the first conveyor usually, though not necessarily at right angles. The article transporting apparatus 20 is constructed and arranged to maintain the articles in their original orientation during their transport from the first conveyor to the second conveyor.

For purpose of illustration, the invention is shown and described with reference to transferring pans P of bread dough from the discharge conveyor 22 of a conventional dough proofer 24 to a conventional industrial type baking oven, not shown. In such proofers, successive rows of pans P of proofed bread dough after being transported through the proofer 20 are pushed by a reciprocating pusher 28 in the direction of their longitudinal axes L—L onto the discharge conveyor 22. The pans P are conveyed by the discharge conveyor 22 in a direction perpendicular to their longitudinal axes L—L and are discharged in such attitude onto the article or pan transporting apparatus 20.

The article transporting apparatus 20 includes a tail end rectilinear section 30 communicating with the discharge end of the proofer discharge conveyor 22, a head end rectilinear section 32 communicating with the receiving end of the conveyor 26 leading to the oven, and a 90° curvilinear intermediate section 34 connecting the adjacent offset ends of the perpendicularly related rectilinear sections 30 and 32.

The transporting apparatus includes a support frame 36 having parallel inner and outer tubular side frame members 38 and 40 defining the rectilinear and curvilinear sections 30, 32 and 34. The frame members 38 and 40 are maintained in spaced relation by a plurality of tubular cross frame members 42. The ends of the side frame members 38 and 40 adjacent the proofer discharge conveyor 22 have secured thereto vertical laterally spaced tail plates 44 and 46. Similarly, the side frame members 38 and 40 adjacent the conveyor 26 have secured thereto vertical laterally spaced head plates 48 and 50. Legs 52 connected in suitable manner to the aforesaid plates and the side frame members support the conveyor support frame 36 a desired distance above the floor.

Considering the transporting apparatus 20 in more detail, it includes two laterally spaced inner and outer endless conveyor elements 54 and 56, illustrated preferably as of table top chain link construction, disposed between the sides of and extending the length of the transporting apparatus. The flat top conveyor elements 54 and 56 may be Model SS881, manufactured by Rex Chainbelt, Inc., Milwaukee, Wisconsin, and include, as best shown in FIGS. 3 and 4, a plurality of links 58 having smooth top surfaces and interfitting knuckles 60, 62 and 64 connected by pins 66 so constructed that adjacent links 58 can pivot with respect to each other on an axis transverse to the conveyor and so as to permit of a certain amount of lateral play to negotiate the 90° curvilinear intermediate section 34 of the transporting apparatus 20.

The conveyor element 56, and this applies in similar manner to conveyor element 54, is trained at its tail end over an idler wheel 68 freely mounted on tail shaft 70 and axially positioned thereon by set collars 72, the shaft 70 being supported at its ends in brackets 74 carried by the tail plates 44 and 46. At their head ends the conveyor elements 54 and 56 are trained over drive sprockets. The drive sprocket for the conveyor element 56 is shown at 76 in FIG. 6, it being understood that a similar drive sprocket is provided for the conveyor element 54. The drive sprockets 76 are fixed on axially alined stub head shafts 78 and 80. The adjacent ends of the stub head shafts 78 and 80 are rotatably mounted in bearings 82 and 84 secured to a support bracket 86 fixed on longitudinally spaced tubular members 88 and 90 extending between and carried by the head plates 48 and 50.

Figure 2:
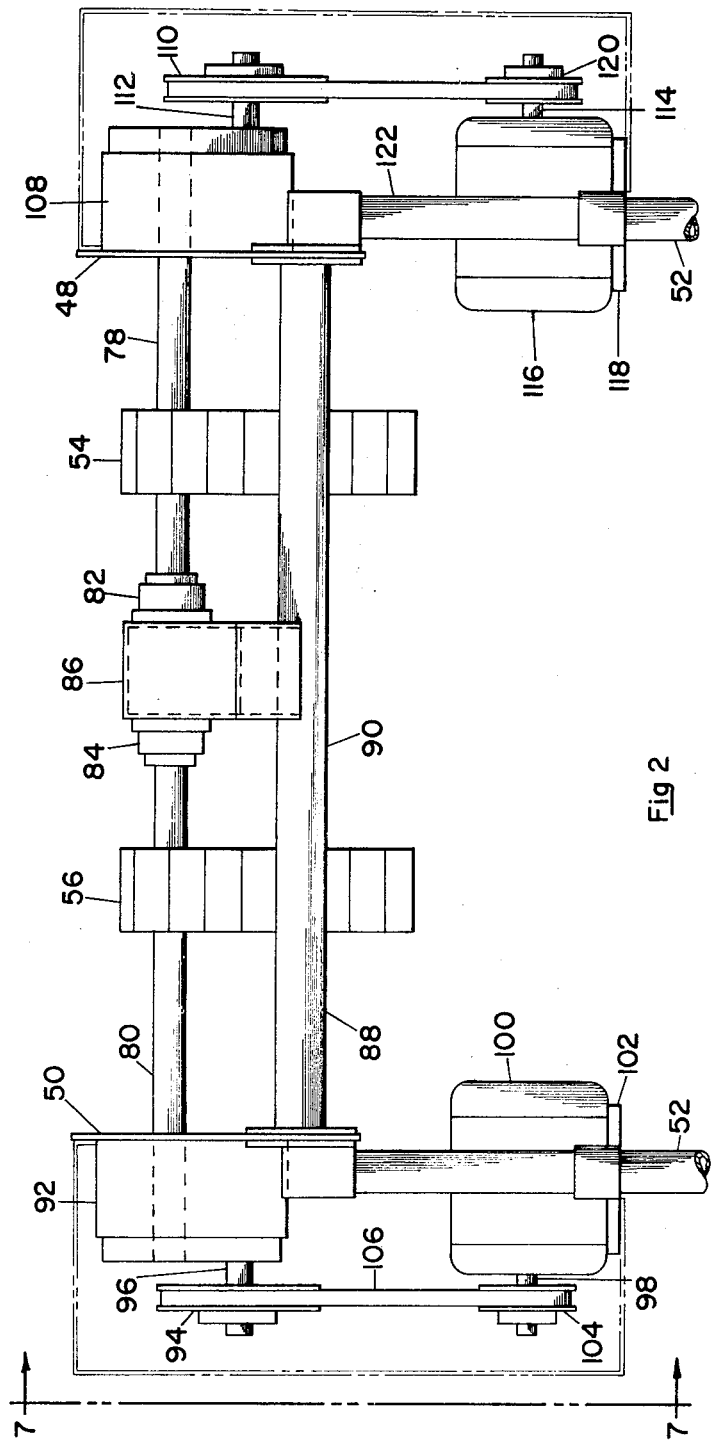
FIG. 2 is an enlarged end view of the apparatus taken on line 2—2 of FIG. 1.

Referring particularly to FIGS. 2 and 7, the outer conveyor stub head shaft 80 is operatively connected at its outer end with a speed reducing transmission 92 mounted on the head plate 50. The speed reducing transmission 92 has an adjustable V-groove pulley 94 secured on its intake shaft 96. The drive shaft 98 of a motor 100 mounted on a bracket 102 has an adjustable V-groove pulley 104 mounted thereon, and a V-belt 106 extends about the pulleys 94 and 104 in the grooves thereof. By adjusting the pulleys 94 and 104 axially on the shafts 96 and 98 in conventional manner, the speed of the outer conveyor element 56 may be adjusted.

The inner conveyor stub head shaft 78 may be operated in similar or any other suitable manner. As shown, the stub head shaft 78 has an operative connection with a speed reducing transmission 108 mounted on the head plate 48. The speed reducing transmission 108 has an adjustable V-groove pulley 110 secured on its intake shaft 112. The drive shaft 114 of a motor 116 mounted on a bracket 118 has an adjustable V-groove pulley 120 mounted thereon, and a V-belt 122 extends about the pulleys 110 and 120 in the grooves thereof. By adjusting the pulleys 110 and 120 axially on the shafts 112 and 114 in conventional manner, the speed of the inner conveyor element 54 may be adjusted.

Referring particularly to the endless outer conveyor element 56, it being understood that this applies as well to the inner conveyor element 54, so that similar parts are identified by the same reference characters; its upper load supporting run is constrained to follow a particular path, hereinafter described, by a pair of parallel laterally spaced planar guide tracks 124 and 126 extending longitudinally substantially the length of the conveyor element 56. As best shown in FIG. 8, the portions 128 and 130 of the planar guide tracks 124 and 126 extending along the rectilinear sections 30 and 32 of the transporting apparatus 20 are adapted to receive between their adjacent edges, the guide elements 132 secured to and depending from the under side of the flat top links 58 of the conveyor elements 54 and 56. The under sides of the links 58 at opposite sides of the guide elements 132 and the laterally opposite side edges of the guide elements 132 are adapted to engage the "Nylatron" wear strips 134 disposed on the top face and the adjacent side edges of the planar guide track portions 128 and 130.

The laterally remote longitudinally extending side edges of the planar guide track portions 128 and 130 are provided with downwardly projecting flanges 136 and 138 bolted or otherwise secured in suitable manner to the upper ends of brackets 140 carried by the tubular cross frame members 42 to thereby support the guide track portions 128 and 130 at an elevation above the cross frame members 42. The lower run of the conveyor elements 56, and this applies also to the conveyor element 54, extending along the rectilinear sections 30 and 32 of the transporting apparatus 20 is supported against sagging by the track supports 142 and is retained against lateral drifting by the track guides 144. The track supports 142 and the track guides 144 are carried by the lower ends of the brackets 140 and are preferably provided respectively, with the "Nylatron" wear strips 146 and 148.

The means for supporting and guiding the outer conveyor element 56, and this applies in similar manner to the inner conveyor element 54, along the 90° curvilinear intermediate section 34 of the transporting apparatus 20 is with minor differences the same as the means for supporting and guiding the conveyor elements 54 and 56 along the rectilinear sections 30 and 32, as described above. As shown in FIG. 9, the planar guide track portions 150 and 152 both extend laterally in the same direction, inwardly of curve, from their respective depending flanges 154 and 156, since for manufacturing purposes, bending of the angles from which they are formed is facilitated. "Nylatron" guide members 158 and 160 secured on the top sides of the guide track portions 150 and 152 are arranged to be engaged by the under sides of the links 58 at opposite sides of the guide elements 132 and the laterally opposite side edges of the guide elements 132, for guiding and restraining the conveyor elements 54 and 56 in the curved path of the intermediate section 34.

The lower runs of the conveyor elements 54 and 56 extending along the curvilinear intermediate section 34 are supported against sagging by the track supports 162. A track guide 164 at the inner sides of the conveyor elements 54 and 56 constrain the conveyor elements 54 and 56 in their curving paths along the curvilinear intermediate section 34, and hold down tracks 166 engaging upper outer edge portions of the conveyor elements 54 and 56 restrain any tendency of the outer portions of the conveyor elements 54 and 56 to raise. The track supports 162, track guide 164 and hold down tracks 166 are carried by the lower ends of the brackets 140 and are preferably provided respectively with the "Nylatron" wear strips 168, 170 and 172.

In conventional article or pan transporting apparatus including first and second angularly related offset rectilinear conveyor sections connected by a curvilinear conveyor section, for example, perpendicularly related first and second conveyor sections connected by a 90° curvilinear conveyor section, as shown in Van Doren U.S. Pat. No. 2,652,143, it is customary to provide each section with an individual conveyor; with the outer and inner conveyor elements of the first rectilinear conveyor section being parallel and operating at the same speed for moving the pans therealong and presenting them to the curvilinear section with their leading faces normal to the direction of travel of the pans; with the outer and inner conveyor elements of the curvilinear section concentric and the outer conveyor element operating at a sufficiently greater speed than the inner conveyor element to turn the pans 90° and present them to the second rectilinear conveyor section with their leading faces normal to the direction of travel of the latter conveyor section; and with the outer and inner conveyor elements of the second rectilinear conveyor section being parallel and operating at the same speed for moving the pans therealong with their leading faces normal to the direction of travel of the pans.

In a specific illustration, with the outer and inner conveyor elements of the first and second rectilinear conveyor sections of prior art conventional constructions operating at, for example, 90 fpm, and the inner conveyor element of the curvilinear conveyor section operating at 90 fpm, it is apparent that the outer conveyor element of the curvilinear conveyor section must travel at a considerably greater rate of speed in order to turn the pans through 90° during their conveyance by the curvilinear conveyor section, or at about 122 fpm where the radius of curvature of the outer conveyor element of the curvilinear conveyor section is 68 inches and the radius of curvature of the inner conveyor element of the curvilinear conveyor section is 50 inches. At high production rates, the high speed of the outer conveyor element relative to the speed of the inner conveyor element becomes excessive, causing loss of control of the pans resulting in overturning or underturning of the pans in their conveyance by the 90° curvilinear conveyor section, particularly where the pan transporting apparatus is employed in situations calling for intermittent operation.

In the construction in accordance with my invention, with the conveyor elements 54 and 56 extending the full length of the rectilinear sections 30 and 32 and the curvilinear section 34, the speed of the outer conveyor element 56 relative to the speed of the inner conveyor element 54 is such that the pans will turn through 90° while traveling the full length of the article transporting apparatus 20 instead of turning through 90° on only curvilinear section 34, as in conventional constructions as described above. Thus, with the same radius of curvature of the inner and outer 90° curvilinear sections 56 and 54 as above, and with length of the rectilinear sections totaling 154 inches, the speed of the outer conveyor element 156 is reduced to approximately 101 fpm.

As previously pointed out, the upper load supporting runs of the inner and outer conveyor elements 54 and 56 are constrained by the guide tracks 124 and 126 to follow particular non-parallel paths as contrasted to the conventional pairs of conveyor elements mounted for movement in parallel paths. The paths to be followed by the conveyor elements 54 and 56 are determined and plotted in the manner now to be described.

Assuming, for purpose of illustration, the distance to be traveled by the pans along the center line 174 of the article transporting apparatus 20 from the midpoint 176 of the tail shaft 70 to the midpoint 178 of the head shafts 78, 80 to be 250 inches. Referring to FIG. 10, the center line 174 from the tail shaft to the head shafts is marked off at points 180 into an arbitrary number of equal spaces or increments 182, as shown for example, into 36 equal spaces or increments. The total degrees through which the pans are to be turned, in the present instance 90°, divided by the number of increments, in the present instance 36, will equal the desired degree of turn per increment, or $$\frac{\text{Total degrees (90°)}}{\text{Number of increments (36)}} = \text{Degree of turn (2.5°) per increment}$$

Lines 184 drawn through the points 180 at successive angles of 2.5° thus represent the longitudinal axes L—L of the pans in their travel from the tail shaft 70 to the head shafts 78, 80. A representative number of pans P are shown in FIG. 10 to illustrate their orientation as they are conveyed from one end to the other of the article transporting apparatus 20.

Still referring particularly to FIG. 10, a pan P-1 at the receiving end of the article transporting apparatus 20 is arranged to bridge the conveyor elements 54 and 56; the conveyor element 54 intersecting the line 184, representing the longitudinal center L—L of pan P-1, at 186, a distance $d$ from the intersection 180 of center line 174 with line 184, and the conveyor element 56 intersecting the line 184, representing the longitudinal center L—L of pan P-1, at 188, a distance $d'$ from the intersection 180 of center line 174 with line 84. The distances $d$ and $d'$ may be equal or unequal and are selected to provide fairly evenly balanced support of the pans on the conveyor elements 54 and 56. In order to limit relative movement between the pans and conveyor elements to pivotal movement, the distance $d + d'$ between the vertical pivotal axes 186 and 188 of the pans is substantially constant from the receiving end to the discharge end of the article transporting apparatus.

As the pans move from the pan receiving end to the pan discharging end of the article transporting apparatus 20, they are turned through 90° as previously pointed out, and pivot on the conveyor elements 54 and 56 about vertical axes. To restrict the movement of the pans relative to the conveyor elements 54 and 56 substantially to pivotal movement exclusive of bodily shifting or displacement of the pans relative to conveyor elements 54 and 56, thereby preventing loss of control of the pans, it is necessary that the conveyor elements 54 and 56 follow a particular path, as previously noted. In order to plot or determine the particular paths to be followed by the conveyor elements 54 and 56, the distances $d$ and $d'$ are laid off on each of the lines 184, representing the longitudinal axes of the pans, providing the additional intersections 186 and 188 constituting the vertical pivotal axes of the pans. An irregular curved line connecting the intersection 186 defines the theoretical path of the conveyor element 54 and an irregular curved line connecting the intersections 188 defines the theoretical path of the conveyor element 56, the intersections 186 and 188 and the curved path of the conveyor elements 54 and 56 being in coincidence.

The curves formed by the intersections 186 and 188 along the rectilinear sections 30 and 32 of the transporting apparatus 20 are so close to straight lines that for practical manufacturing purposes the guide means for controlling the paths of the conveyor elements 54 and 56 along the rectilinear sections 30 and 32 are formed straight though not parallel, as are the phantom lines 190 and 192 indicating the parallel paths of the conveyor elements of prior art pan transporting apparatus. The curves formed by the intersections 186 and 188 along the curvilinear section 34 are so close to circular arcs described respectively from centers 194 and 196 that as a practical matter the guide means for controlling the paths of the conveyor elements 54 and 56 along the curvilinear section 34 are arcuately formed though not parallel as are the phantom lines 194 and 196 indicating the parallel paths of the conveyor elements of prior art pan transporting apparatus.

While the invention has been described, for purpose of illustration, with reference to a pan transporting apparatus in which the curvilinear section extends through 90°, it will be understood that the curvilinear section may be of greater or lesser extent than 90°. Also, the invention has been described with reference to a transporting apparatus having a rectilinear section at each end of the curvilinear section, however it applies in similar manner to a transporting apparatus having a rectilinear section at one end only of the curvilinear section.

Although I have disclosed an exemplary embodiment of my invention herein, it will be understood that various changes, modifications and substitutions may be incorporated in such embodiment without departing from the spirit of the invention.

I claim:

1. An article transporting apparatus having a receiving end and a discharge end, said article transporting apparatus including
   a curvilinear conveying section and a rectilinear conveying section at one end at least of said curvilinear conveying section;
   two laterally spaced endless conveyors each extending throughout the length of said article transporting apparatus from its receiving end to its discharge end;
   means operatively connected with the endless conveyors for operating said endless conveyors at relative different speeds for progressively turning articles spanning and resting at respective pivot areas on pivot contacting areas of said endless conveyors throughout said curvilinear and rectilinear conveying sections; and
   guide means engageable by said endless conveyors constraining their load supporting runs in eccentric paths coinciding with the vertical pivot axes of said articles on said endless conveyors so that the distance between the pivot contacting areas of said conveyors is constant and said articles are discharged from said article transporting apparatus in the same orientation relative to said conveyors as they were delivered thereto.

2. An apparatus in accordance with claim 1, wherein said operating means for said endless conveyor elements includes variable speed drive means for at least one of said conveyor elements for varying the relative speeds of said conveyor elements.

3. An article transporting apparatus as in claim 2, wherein said guide means comprises fixed guide surfaces contacting a portion of the endless conveyors.

4. An article transporting apparatus as in claim 2, wherein each of said conveyors comprises a plurality of links joined together to permit relative pivotal movement therebetween to enable the conveyors to flex in a lateral direction while traversing said curvilinear section.

5. An article transporting apparatus as in claim 3, wherein said links have smooth top surfaces and interfitting knuckles connected by pins so that adjacent links can pivot with respect to each other on an axis transverse to the conveyor.

6. An article transporting apparatus having a receiving end and a discharge end, said article transporting apparatus including
   a curvilinear conveying section and a rectilinear conveying section at one end at least of said curvilinear conveying section;
   a plurality of laterally spaced endless conveyors each extending throughout the length of said article transporting apparatus from its receiving end to its discharge end;
   means operatively connected with the endless conveyors for operating said endless conveyors at relative different speeds for progressively turning articles spanning and resting at respective pivot areas on pivot contacting areas of said endless conveyors throughout said curvilinear and rectilinear conveying sections; and
   guide means engageable by said endless conveyors constraining their load supporting runs in eccentric paths coinciding with the vertical pivot axes of said articles on said endless conveyors so that the distance between the pivot contacting areas of said conveyors is constant and said articles are discharged from said article transporting apparatus in the same orientation relative to said conveyors as they were delivered thereto.

* * * * *